US007491161B2

(12) United States Patent
Taguchi

(10) Patent No.: US 7,491,161 B2
(45) Date of Patent: Feb. 17, 2009

(54) PHOTORECEPTOR DRUMS, METHODS AND APPARATUS FOR ASSEMBLING THE SAME, AND IMAGE-FORMING APPARATUS EMPLOYING THE SAME

(75) Inventor: Susumu Taguchi, Niigata (JP)

(73) Assignee: Mitsubishi Chemical Corporation, Tokyo (JP)

(*) Notice: Subject to any disclaimer, the term of this patent is extended or adjusted under 35 U.S.C. 154(b) by 278 days.

(21) Appl. No.: 11/283,919

(22) Filed: Nov. 22, 2005

(65) Prior Publication Data

US 2006/0140672 A1 Jun. 29, 2006

Related U.S. Application Data

(63) Continuation of application No. PCT/JP03/06406, filed on May 22, 2003.

(51) Int. Cl.
*F16C 13/00* (2006.01)
*G03G 15/00* (2006.01)
*B21K 1/02* (2006.01)

(52) U.S. Cl. .......................... 492/47; 492/18; 399/117; 399/116; 399/159

(58) Field of Classification Search .................. 492/18, 492/16, 25, 47; 399/117, 116, 159
See application file for complete search history.

(56) References Cited

U.S. PATENT DOCUMENTS 3,994,053 A * 11/1976 Hunt .......................... 492/18
4,040,157 A * 8/1977 Shanly ........................ 492/18
4,120,576 A * 10/1978 Babish ........................ 399/116
4,561,763 A * 12/1985 Basch ........................ 399/116
5,461,464 A * 10/1995 Swain ........................ 399/159
5,497,225 A 3/1996 Matsuzuki
5,579,093 A * 11/1996 Wagner et al. .............. 399/159
5,630,196 A * 5/1997 Swain ........................ 399/117
5,774,767 A 6/1998 Shibata et al.
5,799,232 A * 8/1998 Tompkins et al. ........... 399/167
6,002,897 A * 12/1999 Kohno et al. ................ 399/117
6,006,053 A * 12/1999 Ikehara ......................... 399/90
6,094,551 A * 7/2000 Nakamura et al. .......... 399/160

(Continued)

FOREIGN PATENT DOCUMENTS

JP 60-122965 8/1985

(Continued)

*Primary Examiner*—Essama Omgba
(74) *Attorney, Agent, or Firm*—Oblon, Spivak, McClelland, Maier & Neustadt, P.C.

(57) ABSTRACT

An object of the invention is to provide a photoreceptor drum exceedingly advantageous for obtaining clear images free from positional image shifting and image blurring. In the invention, a photoreceptor drum is constituted of a drum main body and a first and second flange members to be attached respectively to both lengthwise-direction ends of the drum main body. The drum main body is constituted of a cylindrical body and a photosensitive layer formed on the surface of the cylindrical body, and the cylindrical body has a fitting hole formed in each end thereof. The first and second flange members have cylindrical parts to be fitted into and fixed to the fitting holes in the drum main body, and further have shaft support parts. The photoreceptor drum has been formed so that the radial deflection thereof based on a central axis L connecting the centers of the shaft support parts of the first and second flange members is 15 μm or less.

7 Claims, 4 Drawing Sheets

U.S. PATENT DOCUMENTS

| | | | | |
|---|---|---|---|---|
| 6,381,429 | B1 | 4/2002 | Shibata et al. | |
| 6,714,752 | B2 * | 3/2004 | Ueno et al. | 399/117 |
| 6,810,935 | B2 * | 11/2004 | Lemens et al. | 156/555 |
| 6,814,693 | B2 * | 11/2004 | Lemens et al. | 492/47 |
| 6,832,639 | B2 * | 12/2004 | Lemens et al. | 156/555 |
| 6,840,298 | B2 * | 1/2005 | Lemens et al. | 156/522 |
| 6,843,296 | B2 * | 1/2005 | Lemens et al. | 156/494 |
| 7,184,690 | B2 * | 2/2007 | Ueno et al. | 399/117 |
| 7,255,041 | B2 * | 8/2007 | Riedel | 101/153 |
| 7,315,710 | B2 * | 1/2008 | Ueno et al. | 399/117 |
| 7,321,742 | B2 * | 1/2008 | Fujishiro et al. | 399/159 |
| 2003/0223773 | A1 * | 12/2003 | Prichett | 399/117 |
| 2006/0165436 | A1 * | 7/2006 | Nishimura | 399/117 |
| 2007/0172253 | A1 * | 7/2007 | Kusano | 399/117 |

FOREIGN PATENT DOCUMENTS

| | | | | |
|---|---|---|---|---|
| JP | 61-148059 | | | 9/1986 |
| JP | 64-21466 | | | 1/1989 |
| JP | 2-232679 | | | 9/1990 |
| JP | 4-93857 | | | 3/1992 |
| JP | 4-81151 | | | 7/1992 |
| JP | 4-251279 | | | 9/1992 |
| JP | 7-28292 | | | 1/1995 |
| JP | 7-140079 | | | 6/1995 |
| JP | 7-140753 | | | 6/1995 |
| JP | 8-5341 | | | 1/1996 |
| JP | 8-220786 | | | 8/1996 |
| JP | 9-50179 | | | 2/1997 |
| JP | 9-185291 | | | 7/1997 |
| JP | 10-80656 | | | 3/1998 |
| JP | 10-288914 | | | 10/1998 |
| JP | 11-15294 | | | 1/1999 |
| JP | 11-160901 | | | 6/1999 |
| JP | 11-216621 | | | 8/1999 |
| JP | 11-242346 | | | 9/1999 |
| JP | 11-242350 | | | 9/1999 |
| JP | 11-242407 | | | 9/1999 |
| JP | 2000-267451 | | | 9/2000 |
| JP | 2000-330448 | | | 11/2000 |
| JP | 2001-248656 | | | 9/2001 |
| JP | 2001-356637 | | | 12/2001 |
| JP | 2002-49279 | | | 2/2002 |
| JP | 2002091233 | A | * | 3/2002 |
| JP | 2003156973 | A | * | 5/2003 |
| JP | 2003255658 | A | * | 9/2003 |
| JP | 2007263895 | A | * | 10/2007 |

* cited by examiner

PHOTORECEPTOR DRUMS, METHODS AND APPARATUS FOR ASSEMBLING THE SAME, AND IMAGE-FORMING APPARATUS EMPLOYING THE SAME

TECHNICAL FIELD

The present invention relates to photoreceptor drums (or electrophotographic photoreceptor drums) for use in image-forming apparatus such as electrophotographic apparatus (e.g., copiers and printers), methods and an apparatus for assembling the same, and image-forming apparatus employing the photoreceptor drums.

BACKGROUND ART

In image-forming apparatus such as electrophotographic apparatus (e.g., copiers and printers), examples of causes of image blurring and the like include working allowances and assembly allowances of various components of the image-forming apparatus, vibration of the image-forming apparatus, and rotation unevenness of photoreceptor drums attributable to gear transmissions.

The present inventor directed attention to a photoreceptor drum itself, which is a major component of an image-forming apparatus, in order to obtain clear images.

Namely, a photoreceptor drum is constituted of a drum main body having a photosensitive layer formed thereon and a flange member to be attached to one end of the drum main body. The photoreceptor drum is disposed in an image-forming apparatus so that it rotates on a central axis which connects the center of a shaft support part formed at the other end of the drum main body to the center of a shaft support part formed in or on the flange member. Alternatively, a photoreceptor drum is constituted of a drum main body and flange members to be attached respectively to both ends of the drum main body, and this photoreceptor drum is disposed in an image-forming apparatus so that it rotates on a central axis which connects the centers of shaft support parts of the respective flange members at both ends of the drum main body.

When the photoreceptor drum has deflection, i.e., when the photoreceptor drum is bent (the photoreceptor drum itself is in a bent state) or has axis position shifting (the state in which the center of the outer circumference of the photoreceptor drum differs from the center of rotation), then the deflection attributable to the bending or axis position shifting, during the formation and transfer of electrostatic latent images, causes image shifting from the positions where images are to be formed.

Illustratively stated, in an apparatus in which laser scanning with a polygonal mirror is conducted, such as a laser beam printer, laser beam incidence during the formation of an electrostatic latent image becomes more oblique as the image-forming position approaches an end of the photoreceptor drum. Because of this, in case where the photoreceptor drum is bent or has axis position shifting, main-scanning-direction shifting occurs in which the positions to which the laser beam reaches shift in the drum axis directions.

Furthermore, when the photoreceptor drum is bent or has axis position shifting, it has unevenness in the distance from the center of rotation of the photoreceptor drum to the surface of the photoreceptor drum, i.e., in radius of rotation. Because of this, in areas which have a small radius of rotation, the photoreceptor drum surface has a reduced rate of movement relative to the exposure system, resulting in a contracted electrostatic image. In areas which have a large radius of rotation, the photoreceptor drum surface has an increased rate of movement relative to the exposure system, resulting in an elongated electrostatic image. Namely, side-scanning-direction shifting occurs.

As a result, the image printed is distorted. Especially in the case of a color copier of the type called tandem, in which photoreceptor drums arranged in parallel are used, those troubles markedly appear as positional shifting and color shifting because the photoreceptor drums are separately used for respective colors.

In an apparatus employing a light-emitting diode as an illuminator, as another kind of apparatus, rotation with deflection is apt to cause image blurring because of the short focal distance and this problem is serious.

As long as the photoreceptor drum has been assembled as designed and has no deflection, problems such as those described above do not arise. However, it is virtually almost impossible to obtain a photoreceptor drum completely free from deflection.

When attention is directed to photoreceptor drums only, there is no quantitative standard as to how high the degree of deflection of a photoreceptor drum is when clear images are not obtained, or as to how narrow the range of working allowances is when clear images can be obtained.

As a result, various expedients have hitherto been taken for obtaining clear images from standpoints not concerning photoreceptor drums themselves. For example, reduction in assembly allowances and inhibition of apparatus vibration are attempted on the assumption that some degree of deflection is unavoidable, or reduction in the rotation unevenness of a photoreceptor drum is attempted (e.g., JP-A-2000-330448).

However, these expedients have come to have limitations with the recent trend toward resolution increase and color image formation in image-forming apparatus. Some further improvement has been desired.

The invention has been achieved under the circumstances described above. An object of the invention is to provide a photoreceptor drum exceedingly advantageous for obtaining clear images free from positional image shifting and image blurring.

Another object of the invention is to provide a method and apparatus by which a photoreceptor drum capable of giving clear images can be easily assembled without fail.

A still other object of the invention is to provide an image-forming apparatus capable of giving clear images.

DISCLOSURE OF THE INVENTION

In order to accomplish those objects, the invention provides a photoreceptor drum which comprises a drum main body having a photosensitive layer formed on the outer circumferential surface thereof and a flange member attached to one lengthwise-direction end of the drum main body and which rotates on a central axis connecting the center of a shaft support part formed at the other end of the drum main body to the center of a shaft support part formed in or on the flange member, wherein the photoreceptor drum has been formed so that the degree of radial deflection of the photoreceptor drum based on the central axis is 15 μm or less.

The invention further provides a photoreceptor drum which comprises a drum main body having a photosensitive layer formed on the outer circumferential surface thereof and flange members respectively attached to both lengthwise-direction ends of the drum main body and which rotates on a central axis connecting the centers of shaft support parts respectively formed in or on the two flange members, wherein the photoreceptor drum has been formed so that the degree of radial deflection of the photoreceptor drum based on the central axis is 15 μm or less.

The invention furthermore provides a method of assembling a photoreceptor drum which comprises a drum main body having a photosensitive layer formed on the outer circumferential surface thereof and a flange member to be attached to one lengthwise-direction end of the drum main body, the flange member having a shaft support part serving as the center of rotation of the flange member and a cylindrical part to be fitted into and fixed to a fitting hole formed in said one lengthwise-direction end of the drum main body, and in which the degree of radial deflection of the photoreceptor drum based on a central axis connecting the center of a shaft support part formed at the other end of the drum main body to the center of the shaft support part of the flange member is not larger than a given value, which method comprises: measuring or determining the degree and direction of radial deflection of the drum main body based on the shaft support part at said other end of the drum main body and on the fitting hole, measuring or determining the degree and direction of radial deflection of the outer circumferential surface of the cylindrical part of the flange member based on the shaft support part of the flange member, determining the difference between the degree of deflection of the drum main body and the degree of deflection of the outer circumferential surface of the cylindrical part of the flange member, and when the difference is not larger than that given value, then fitting and fixing the cylindrical part of the flange member into the fitting hole in the drum main body so that the direction of deflection of the outer circumferential surface of the cylindrical part is almost opposite to the direction of deflection of the drum main body.

The invention still further provides a method of assembling a photoreceptor drum which comprises a drum main body having a photosensitive layer formed on the outer circumferential surface thereof and a flange member to be attached to one lengthwise-direction end of the drum main body, the flange member having a shaft support part serving as the center of rotation of the flange member and a cylindrical part to be fitted into and fixed to a fitting hole formed in said one lengthwise-direction end of the drum main body, and which rotates on a central axis connecting the center of a shaft support part formed at the other end of the drum main body to the center of the shaft support part of the flange member, which method comprises: measuring or determining the degree and direction of radial deflection of the drum main body based on the shaft support part at said other end of the drum main body and on the fitting hole, measuring or determining the degree and direction of radial deflection of the outer circumferential surface of the cylindrical part of the flange member based on the shaft support part of the flange member, determining the difference between the degree of deflection of the drum main body and the degree of deflection of the outer circumferential surface of the cylindrical part of the flange member, and when the difference is 15 μm or smaller, then fitting and fixing the cylindrical part of the flange member into the fitting hole in the drum main body so that the direction of deflection of the outer circumferential surface of the cylindrical part is almost opposite to the direction of deflection of the drum main body.

The invention still further provides a method of assembling a photoreceptor drum which comprises a drum main body having a photosensitive layer formed on the outer circumferential surface thereof and flange members to be attached respectively to both lengthwise-direction ends of the drum main body, each flange member having a shaft support part serving as the center of rotation of the flange member and a cylindrical part to be fitted into and fixed to one of two fitting holes respectively formed in both lengthwise-direction ends of the drum main body, and in which the degree of radial deflection of the photoreceptor drum based on a central axis connecting the centers of the shaft support parts of the respective flange members at both ends is not larger than a given value, which method comprises: measuring or determining the degree and direction of radial deflection of the drum main body based on the fitting holes in both ends, measuring or determining the degree and direction of radial deflection of the outer circumferential surface of each flange member based on the shaft support part, determining the difference between the degree of deflection of the drum main body and the degree of deflection of the outer circumferential surface of the cylindrical part of each flange member, and when the difference is not larger than that given value, then fitting and fixing the cylindrical parts of the flange members into the fitting holes in the drum main body so that the direction of deflection of the outer circumferential surface of the cylindrical part of each flange member is almost opposite to the direction of deflection of the drum main body.

The invention still further provides a method of assembling a photoreceptor drum which comprises a drum main body having a photosensitive layer formed on the outer circumferential surface thereof and flange members to be attached respectively to both lengthwise-direction ends of the drum main body, each flange member having a shaft support part serving as the center of rotation of the flange member and a cylindrical part to be fitted into and fixed to one of two fitting holes respectively formed in both lengthwise-direction ends of the drum main body, which method comprises: measuring or determining the degree and direction of radial deflection of the drum main body based on the fitting holes in both ends, measuring or determining the degree and direction of radial deflection of the outer circumferential surface of each flange member based on the shaft support part, determining the difference between the degree of deflection of the drum main body and the degree of deflection of the outer circumferential surface of the cylindrical part of each flange member, and when the difference in deflection is 15 μm or smaller, then fitting and fixing the cylindrical parts of the flange members into the fitting holes in the drum main body so that the direction of deflection of the outer circumferential surface of the cylindrical part of each flange member is almost opposite to the direction of deflection of the drum main body.

The invention still further provides an assembling apparatus for assembling a photoreceptor drum which comprises a drum main body having fitting holes respectively formed in both lengthwise-direction ends thereof and a first flange member and a second flange member each having a cylindrical part capable of being fitted into the corresponding fitting hole, the first flange member and the second flange member having been attached respectively to both ends of the drum main body, with the cylindrical parts fitted in the fitting holes, and which rotates on a central axis connecting the centers of shaft support parts respectively formed in or on the first flange member and second flange member, which apparatus comprises: a table on which the drum main body is placed so that the direction of radial deflection of the drum main body as measured based on the fitting holes in both ends of the drum main body is faced in a given direction, a first and second supporting part which have been disposed on both sides of the table and removably support the first and second flange members almost coaxially with the drum main body placed on the table, a first and second rotating device which respectively rotate the first and second flange members supported by the first and second supporting parts, a moving device which moves one of the first and second supporting parts in directions in which the distance between the two parts increases and decreases, a measuring device which measures or determines the degree and direction of radial deflection of the outer circumferential surface of the cylindrical part of each of the first and second flange members supported by the first and second supporting parts, based on the shaft support part, and a control device which controls the rotating devices concerning rotation and the moving device concerning movement, wherein the control device is so designed as to perform the following procedures: operating the rotating devices to rotate the first and second supporting parts and simultaneously causing the measuring device to measure or determine the degree and direction of radial deflection of the outer circumferential surface of the cylindrical part of each of the first and second flange members based on the shaft support part; comparing the degree of deflection of the drum main body with the degree of deflection of each of the first and second flange members; and when the difference is not larger than a given value, operating the rotating devices so that the direction of deflection of each of the first and second flange members becomes almost opposite to that given direction and then operating the moving device to fit the cylindrical parts of the first and second flange members respectively into both ends of the drum main body.

The invention still further provides a tandem color-image-forming apparatus including photoreceptor drums which have been disposed so that their lengthwise directions are in parallel and which each comprise a drum main body having a photosensitive layer formed on the outer circumferential surface thereof and a flange member attached to one lengthwise-direction end of the drum main body and which rotate on a central axis connecting the center of a shaft support part formed at the other end of the drum main body to the center of a shaft support part formed in or on the flange member, wherein the photoreceptor drums each have been formed so that the degree of radial deflection of the photoreceptor drum based on the central axis is 15 μm or less.

The invention still further provides a tandem color-image-forming apparatus including photoreceptor drums which have been disposed so that their lengthwise directions are in parallel and which each comprise a drum main body having a photosensitive layer formed on the outer circumferential surface thereof and flange members respectively attached to both lengthwise-direction ends of the drum main body and which rotate on a central axis connecting the centers of shaft support parts respectively formed in or on the two flange members, wherein the photoreceptor drums each have been formed so that the degree of radial deflection of the photoreceptor drum based on the central axis is 15 μm or less.

The invention still further provides a method of assembling a photoreceptor drum which comprises a drum main body having a photosensitive layer formed on the outer circumferential surface thereof and flange members to be attached respectively to both lengthwise-direction ends of the drum main body, each flange member having a shaft support part serving as the center of rotation of the flange member and a cylindrical part to be fitted into and fixed to one of two fitting holes respectively formed in both lengthwise-direction ends of the drum main body, and in which the degree of radial deflection of the photoreceptor drum based on a central axis connecting the centers of the shaft support parts of the respective flange members at both ends is 15 μm or less, which method comprises: preparing, for use as said drum main body, many drum main bodies in each of which the degree of radial deflection based on the fitting holes in both ends is 7 μm or less, preparing, for use as said flange members, many flange members in each of which the distance between the center of the cylindrical part and the center of the shaft support part is 5 μm or less, and randomly selecting a combination of a drum main body and flange members from these and fitting and fixing the cylindrical parts into the fitting holes.

The invention still further provides a method of assembling a photoreceptor drum which comprises a drum main body having a photosensitive layer formed on the outer circumferential surface thereof and one or two flange members to be attached to one or both lengthwise-direction ends of the drum main body and in which the degree of radial deflection of the photoreceptor drum is 15 μm or less, which method comprises: forming a bearing fitting hole in each of both lengthwise-direction ends of the drum main body and forming a flange member fitting hole in one or both lengthwise-direction ends of the drum main body continuously outside the bearing fitting hole, fitting and fixing a bearing into each bearing fitting hole in the drum main body, and fitting and fixing a flange member having a shaft through-hole having an inner diameter larger than the bearing hole of the bearing into the flange member fitting hole formed outside the bearing fitted and fixed.

The invention still further provides a method of assembling a photoreceptor drum which comprises a drum main body comprising a cylindrical body having a photosensitive layer formed on the outer circumferential surface thereof and flange members to be attached respectively to both lengthwise-direction ends of the drum main body, the flange members each having a shaft support part serving as the center of rotation of the flange member and a cylindrical part to be fitted into and fixed to one of fitting holes respectively formed in both lengthwise-direction ends of the drum main body, and in which the degree of radial deflection of the photoreceptor drum based on a central axis connecting the centers of the shaft support parts of the flange members at both ends is 15 μm or less, which method comprises: forming a fitting hole in each of both lengthwise-direction ends of the cylindrical body, attaching a first and second flange member by fitting and fixing the cylindrical parts thereof into the respective fitting holes, turning the outer circumferential surface of the cylindrical body using the shaft support parts of the first and second flange members as a base, and forming a photosensitive layer on the turned outer circumferential surface of the cylindrical body.

The invention still further provides an image-forming apparatus employing any of the photoreceptor drums described above.

The photoreceptor drums of the invention are exceedingly advantageous for obtaining clear images free from positional image shifting and image blurring.

According to the assembling methods and apparatus of the invention, a photoreceptor drum capable of giving clear images can be easily obtained without fail.

According to the image-forming apparatus of the invention, clear images free from positional image shifting and image blurring can be obtained.

In the figures, numeral 12 denotes a photoreceptor drum, 14 a drum main body, 16 a first flange member, 18 a second flange member, 1602 and 1802 a cylindrical part, 1610 and 1810 a bearing hole, 26 a table, 28A and 28B a supporting part, 30A and 30B a rotating device, 32A and 32B an elevator, and 34 a moving device.

BEST MODE FOR CARRYING OUT THE INVENTION

Embodiments of the photoreceptor drums, methods and apparatus for assembling the same, and image-forming apparatus employing the same according to the invention will be explained below.

The photoreceptor drums are explained first.

Figure 1A:
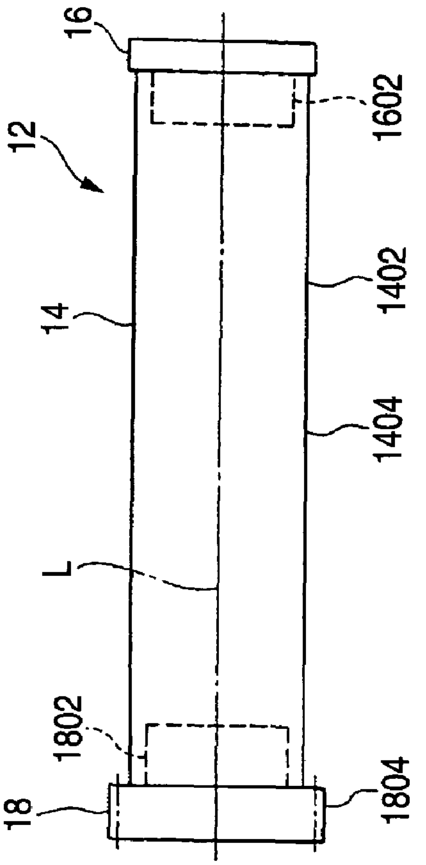
FIG. 1(A) is a front view of a photoreceptor drum.

FIG. 1(A) is a front view of a photoreceptor drum, and (B) is an exploded view of the photoreceptor drum.

Figure 1B:
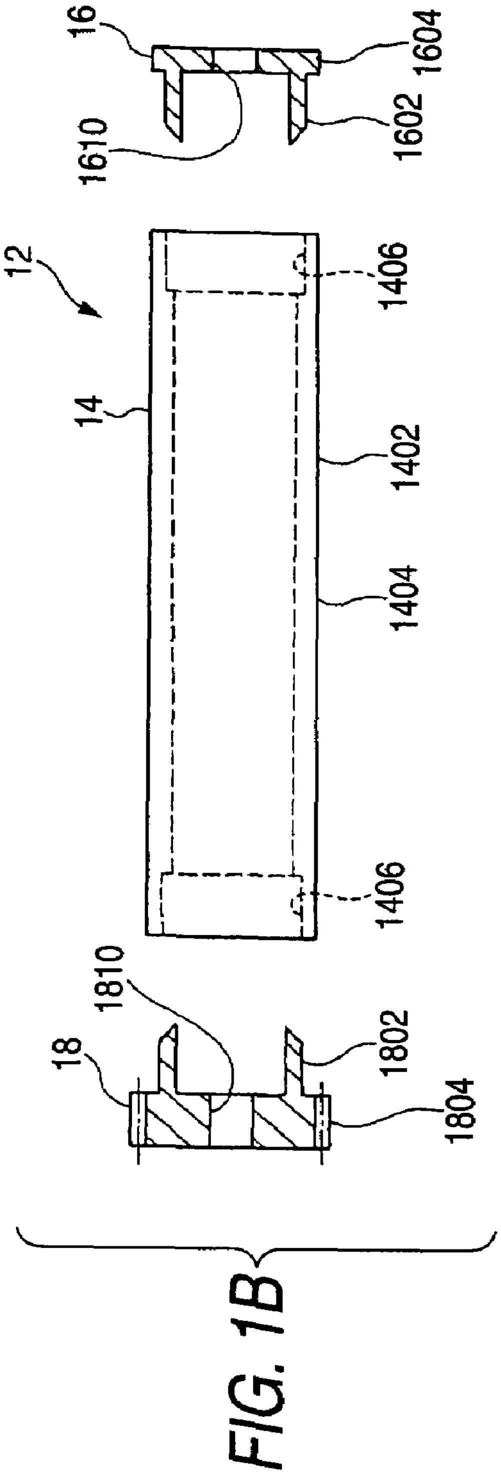
FIG. 1(B) is an exploded view of the photoreceptor drum.

As shown in FIG. 1, the photoreceptor drum 12 is constituted of a drum main body 14 and a first and second flange member 16 and 18 to be concentrically attached to both lengthwise-direction ends of the drum main body 14.

The drum main body 14 is constituted of a cylindrical body 1402 and a photosensitive layer 1404 formed on the surface of the cylindrical body 1402. The cylindricyal body 1402 has fitting holes 1406 respectively formed in both ends thereof.

The first flange member 16 is constituted of a cylindrical part 1602 to be fitted into and fixed to the fitting hole 1406 in one end of the drum main body 14, a large-diameter part 1604 having a larger diameter than the cylindrical part 1602, and a shaft support part 1610.

The second flange member 18 is constituted of: a cylindrical part 1802 to be fitted into and fixed to the fitting hole 1406 in the other end of the drum main body 14; a gear 1804 disposed so as to be adjacent to an end part of the drum main body 14 after the cylindrical part 1802 has been fitted into and fixed to that end of the drum main body; and a shaft support part 1810.

Disposition of the photoreceptor drum 12 in an image-forming apparatus is accomplished by bringing the shaft support parts 1610 and 1810 of the first and second flange members 16 and 18 into the state of being rotatably supported on the frame side of the image-forming apparatus. For example, in the case where the shaft support parts 1610 and 1810 of the first and second flange members 16 and 18 are in a shaft form, they are rotatably supported by bearing holes in the frame. On the other hand, in the case where the shaft support parts 1610 and 1810 are in a hole form, they are rotatably supported by shafts disposed on the frame side. In this embodiment, the shaft support parts 1610 and 1810 are constituted of bearing holes.

A driving gear not shown in the figure mates with the gear 1804. The photoreceptor drum 12 is disposed so that it is rotated through the driving gear and the gear 1804 on a central axis L which connects the centers of the shaft support parts 1610 and 1810.

In this embodiment, the photoreceptor drum 12 has been formed so that the radial deflection thereof based on the central axis L connecting the centers of the shaft support parts 1610 and 1810 of the first and second flange members 16 and 18 is 15 μm or less, or 10 μm or less.

This deflection is measured, for example, with any of known various high-precision measuring instruments such as distance sensors (e.g., laser interferometers) and displacement sensors (e.g., scanning laser displacement meters) while the photoreceptor drum 12 supported horizontally is being rotated on the central axis L. The photoreceptor drum 12 according to this embodiment has been formed so that the degree of radial deflection thereof is 15 μm or less, or 10 μm or less. The term radial deflection as used in the invention means the maximum value of deflection as measured at any desired position (corresponding to "total deflection" in JIS).

The inventor obtained a photoreceptor drum 12 comprising a drum main body 14 made of an aluminum alloy and having an outer diameter of 30 mm, length of 350 mm, and fitting-part wall thickness at each end of 0.75 mm and a first flange member 16 and a second flange member 18 which were made of a synthetic resin and had been attached respectively to both ends of the drum main body 14. Such photoreceptor drums 12 which had various values of the degree of radial deflection based on the central axis L were prepared in a total number of 20. These photoreceptor drums were: five photoreceptor drums 12-1 to 12-5 which had a degree of deflection of 10 μm or less; five photoreceptor drums 12-6 to 12-10 which had a degree of deflection of 11μm to 15 μm; five photoreceptor drums 12-11 to 12-15 which had a degree of deflection of 16 μm to 20 μm; and five photoreceptor drums 12-16 to 12-20 which had a degree of deflection of 21 μm to 25 μm. These photoreceptor drums 12, i.e., photoreceptor drums 12-1 to 12-20, were subjected to a test.

In this test, the degree of radial deflection is expressed in terms of the value obtained through a measurement on a lengthwise-direction central part of the drum main body 14.

The contents of the test are as follows.

Each photoreceptor drum 12 was attached to a cartridge for yellow for a tandem full-color printer capable of printing on A3-size paper. An image comprising white characters on a dark photograph background was outputted in the high-resolution (1,200 dpi) mode.

The image outputted was examined visually and with an optical microscope (50 diameters) to evaluate color shifting in a central part of the image.

Specifically, the degree of yellow tone protrusion from the periphery of the white characters on the dark background was ranked. Color superposition is conducted with dots of about 100 μm. Images in which the degree of shifting was 50 μm or more are indicated by C, ones in which the degree of shifting was 20-50 μm are indicated by B, and ones in which the degree of shifting was 20 μm or less are indicated by A. Incidentally, cartridges in ordinary use corresponded to a rank between C and B although they differed in performance in some degree.

The results of this test are shown in Table 1.

TABLE 1

| Radial deflection (μm) | Test piece | Evaluation |
|---|---|---|
| 0-10 | photoreceptor drum 12-1 | A |
| | photoreceptor drum 12-2 | A |
| | photoreceptor drum 12-3 | A |
| | photoreceptor drum 12-4 | A |
| | photoreceptor drum 12-5 | A |
| 11-15 | photoreceptor drum 12-6 | B |
| | photoreceptor drum 12-7 | B |
| | photoreceptor drum 12-8 | B |
| | photoreceptor drum 12-9 | B |
| | photoreceptor drum 12-10 | B |
| 16-20 | photoreceptor drum 12-11 | B |
| | photoreceptor drum 12-12 | B |
| | photoreceptor drum 12-13 | C |
| | photoreceptor drum 12-14 | B |
| | photoreceptor drum 12-15 | C |
| 21-25 | photoreceptor drum 12-16 | C |
| | photoreceptor drum 12-17 | C |
| | photoreceptor drum 12-18 | C |
| | photoreceptor drum 12-19 | C |
| | photoreceptor drum 12-20 | B |

The following are apparent from Table 1. In the case of the photoreceptor drums 12 having a degree of radial deflection of 21 μm to 25 μm, the proportion of photoreceptor drums giving images of poor quality was large. In the case of the photoreceptor drums 12 having a degree of deflection of 16 μm to 20 μm, images of poor quality were still obtained although the proportion of photoreceptor drums giving satisfactory images increased. In the case of the photoreceptor drums 12 having a degree of deflection of 11 μm to 15 μm, all the photoreceptor drums 12 gave satisfactory images. In the case where the degree of deflection was 10 μm or less, all the photoreceptor drums 12 gave exceedingly satisfactory images.

Consequently, the photoreceptor drums 12 which have been formed so as to have a degree of radial deflection of 15 μm or less give satisfactory images, and the photoreceptor drums 12 which have been formed so as to have a degree of radial deflection of 10 μm or less give exceedingly satisfactory images.

Therefore, when used in an image-forming apparatus capable of higher resolution, the photoreceptor drum 12 according to this embodiment is exceedingly advantageous for obtaining clear images free from positional image shifting and image blurring.

In tandem color-image-forming apparatus in which two or more (generally four) photoreceptor drums have been disposed so that their lengthwise directions are in parallel, the deflection of the photoreceptor drums markedly cause troubles such as positional shifting and color shifting. Consequently, use of photoreceptor drums 12 according to this embodiment in a tandem color-image-forming apparatus, in other words, to use a tandem color-image-forming apparatus constituted of photoreceptor drums 12 according to this embodiment is exceedingly advantageous for obtaining clear images free from positional shifting and color shifting.

Incidentally, the embodiment described above was a photoreceptor drum 12 comprising a drum main body 14 and a first and second flange member 16 and 18 attached respectively to both ends of the drum main body 14. However, it is a matter of course that the invention is applicable also to a photoreceptor drum 12 comprising a drum main body 14 which has a flange member attached only to one lengthwise-direction end thereof and has, at the other end thereof, a shaft support part integrally formed with the drum main body 14.

One embodiment of the methods of assembling the photoreceptor drum described above will be explained below together with an assembling apparatus.

Figure 2:
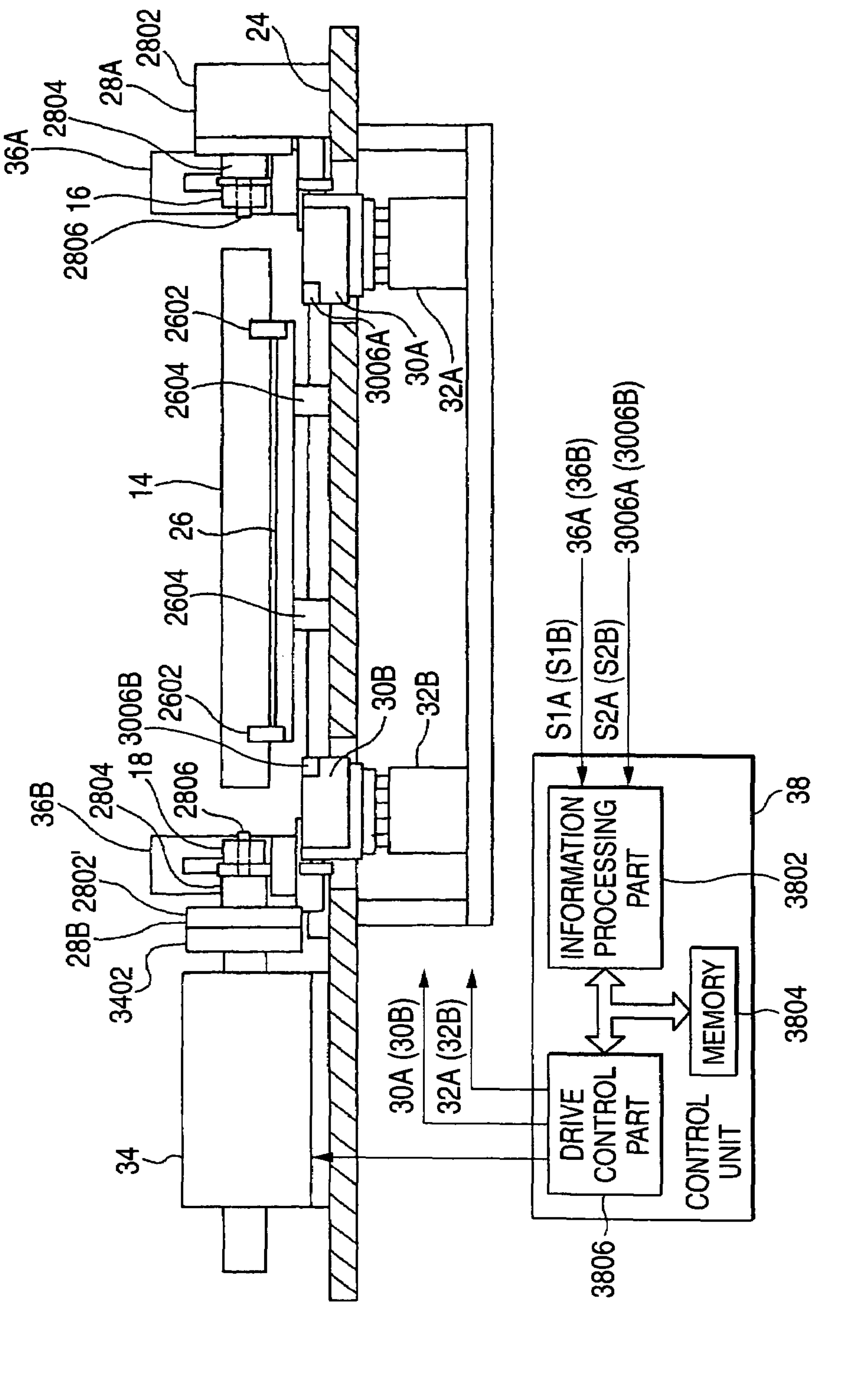
FIG. 2 is a front view of a photoreceptor drum assembling apparatus.
Figure 3:
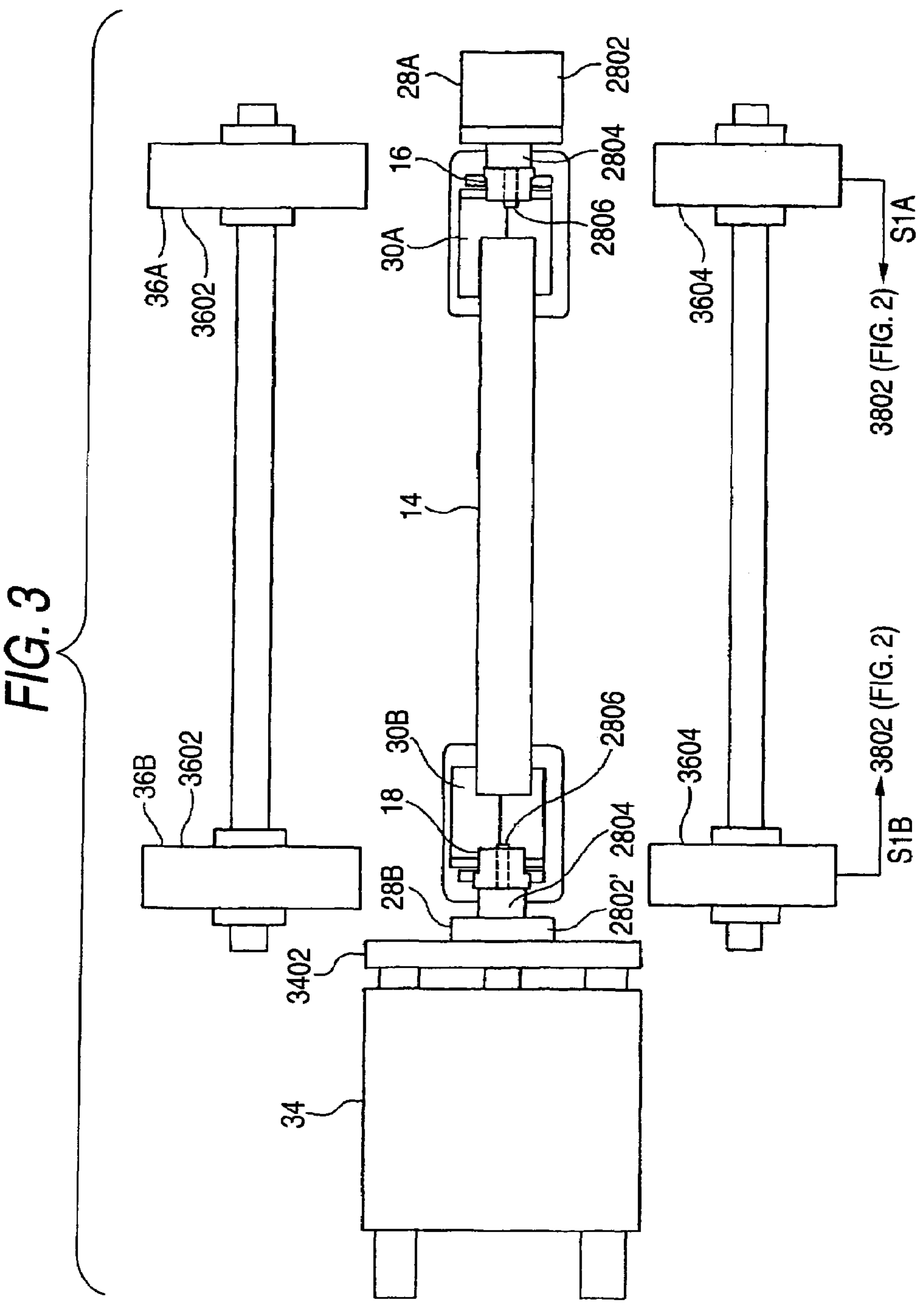
FIG. 3 is a plan view of the photoreceptor drum assembling apparatus.

FIG. 2 is a front view of a photoreceptor drum assembling apparatus; FIG. 3 is a plan view of the photoreceptor drum assembling apparatus; and FIGS. 4(A) and (B) are enlarged views of rotating device and elevator parts.

The apparatus for assembling a photoreceptor drum 12 comprises: a base 24; a table 26 which has been disposed over the base 24 and on which a drum main body 14 is to be placed; a first and second supporting part 28A and 28B disposed respectively on both sides of the table 26; a first and second rotating device 30A and 30B which respectively rotate a first and second flange member 16 and 18 supported by the first and second supporting parts 28A and 28B; a first and second elevator 32A and 32B which elevate or lower the rotating devices 30A and 30B; a moving device 34 which moves the second supporting part 28B in directions in which the distance between the supporting part 28B and the drum main body 14 increases and decreases; a first and second transmission type laser displacement meter 36A and 36B disposed respectively at the first and second supporting parts 28A and 28B; a first and second rotary encoder 3006A and 3006B mounted in the first and second rotating devices 30A and 30B; and a control unit (control device) 38 which controls various operations in this assembling apparatus.

The table 26 has two table members 2602 having V grooves in which both ends of a drum main body 14 are to be placed. The drum main body 14 is placed on these table members 2602, with the axis of the drum main body 14 extending in a horizontal direction X. The drum main body 14 is thus supported on the table 26.

The table members 2602 are moved in a direction perpendicular to the plane of FIG. 2 (i.e., in a horizontal direction Y perpendicular to the horizontal direction X) through sliders 2604 by means of a driving device which is not shown in the figure and is controlled by the control unit 38. The table members 2602 have been disposed so that they move between a measuring/fitting position, which is located between the supporting parts 28A and 28B on both sides, and a standby position apart from the measuring/fitting position.

The first supporting part 28A comprises a supporting base 2802 fixed to the base 24, a shaft 2804 formed on this supporting base 2802, and a spindle 2806 projecting from the center of the flat end of this shaft 2804. The shaft 2804 has almost the same diameter as the first flange member 16, and the spindle 2806 has such a diameter that it can be inserted into and pulled out of the bearing hole 1610 of the first flange member 16.

The second supporting part 28B comprises a supporting base 2802', a shaft 2804 formed on this supporting base 2802', and a spindle 2806 projecting from the center of the flat end of this shaft 2804. The shaft 2804 has almost the same diameter as the second flange member 18, and the spindle 2806 has such a diameter that it can be inserted into and pulled out of the bearing hole 1810 of the second flange member 18.

The second supporting part 28B is moved by the moving device 34 in directions in which the distance between the second supporting part 28B and the drum main body 14 increases and decreases. Because of this, the second supporting part 28B is not in the state of being fixed to the base 24 as in the case of the first supporting part 28A but is supported by the moving device 34. Namely, the moving device 34 is constituted of an air cylinder and has a moving base 3402 which moves in the horizontal direction X based on air supply/discharge. The supporting base 2802' of the second supporting part 28B has been fixed to this moving base 3402.

The table 26 and the two table members 2602 have been disposed so that when the table 26 is located in the measuring/fitting position, then the drum main body 14 placed on the table members 2602 is almost coaxial with the first and second flange members 16 and 18 supported by the spindles 2806 of the supporting parts 28A and 28B on both sides.

The first rotating device 30A and the second rotating device 30B have the same constitution, and the first elevator 32A and the second elevator 32B have the same constitution. Consequently, the first rotating device 30A and the first elevator 32A only are shown in FIG. 4 in detail.

Figure 4B:
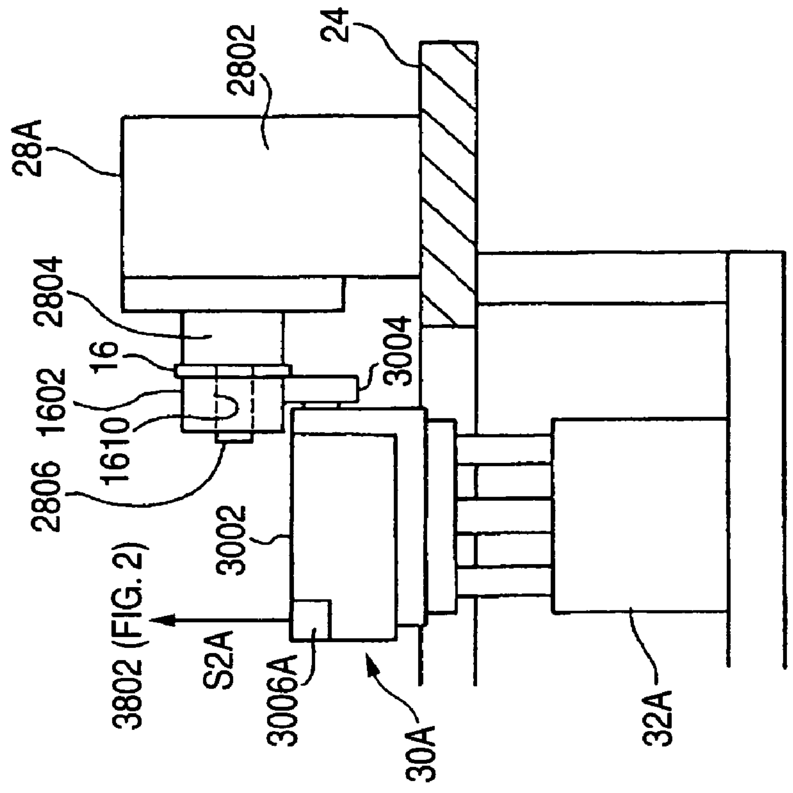
FIGS. 4(A) and (B) are enlarged views of rotating device and elevator parts.
Figure 4A:
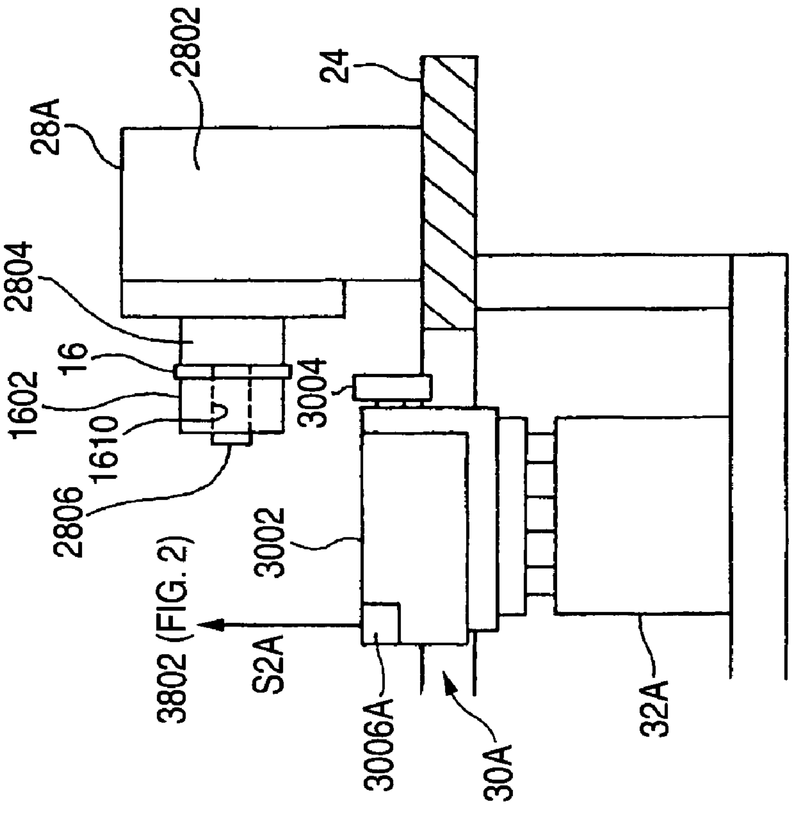

As shown in FIG. 4, the first rotating device 30A is constituted of a motor 3002 and a roller 3004 which is rotated by the motor 3002. The circumferential surface of the roller 3004 is made of a material having a high coefficient of friction, and is preferably made of a rubbery material combining a high coefficient of friction and elasticity. The second rotating device 30B also is constituted of a motor 3002 and a roller 3004.

The first and second rotating devices 30A and 30B are elevated/lowered between a measuring position, which is located above the top of the base 24 and at which the rollers 3004 are in contact with the outer circumferential surfaces of the cylindrical parts 1602 and 1802 of the first and second flange members 16 and 18, and a standby position, which is located below the base 24, through openings in the base 24 with the elevators 32A and 32B each comprising, e.g., an air cylinder or the like. The motors 3002 of the first and second rotating devices 30A and 30B and the elevators 32A and 32B are regulated by the control unit 38.

When the first and second rotating devices 30A and 30B come to be located in the measuring position and the rollers 3004 of the first and second rotating devices 30A and 30B come into contact with the outer circumferential surfaces of the cylindrical parts 1602 and 1802 of the first and second flange members 16 and 18, then the bearing holes 1610 and 1810 in the first and second flange members 16 and 18 are pushed on one side thereof against the spindles 2806. While the first and second rotating devices 30A and 30B are kept in this state, the motors 3002 are operated to rotate the first and second flange members 16 and 18. Consequently, the first and second flange members 16 and 18 rotate on the bearing holes 1610 and 1810.

The assembling apparatus in this embodiment is equipped with a measuring device for measuring or determining the degree and direction of radial deflection, based on the shaft support part 1610 or 1810, of the outer circumferential surface of each of the cylindrical parts 1602 and 1802 of the first and second flange members 16 and 18 supported by the first and second supporting parts 28A and 28B.

This measuring device is constituted of a first and second transmission type laser displacement meter 36A and 36B disposed on the first and second supporting parts 28A and 28B, a first and second rotary encoder 3006A and 3006B mounted in the first and second rotating devices 30A and 30B, and an information processing part 3802 in the control unit 38.

The first transmission type laser displacement meter 36A detects the displacement of the outer circumferential surface of the cylindrical part 1602 of the first flange member 16 supported by the first supporting part 28A and outputs a sensor signal S1A indicating the displacement. Likewise, the second transmission type laser displacement meter 36B detects the displacement of the outer circumferential surface of the cylindrical part 1802 of the second flange member 18 supported by the second supporting part 28B and outputs a sensor signal S1B indicating the displacement.

The first rotary encoder 3006A detects the rotation angle of the roller 3004 of the first rotating device 30A and outputs a sensor signal S2A indicating the rotation angle. Likewise, the second rotary encoder 3006B detects the rotation angle of the roller 3004 of the second rotating device 30B and outputs a sensor signal S2B indicating the rotation angle.

The information processing part 3002 in the control unit 38 receives and processes the sensor signals S1A, S1B, S2A, and S2B. Thus, the information is extracted which indicates the degree and direction of radial deflection, based on the shaft support part 1610 and 1810, of the outer circumferential surface of each of the cylindrical parts 1602 and 1802 of the first and second flange members 16 and 18 supported by the first and second supporting parts 28A and 28B.

A more detailed explanation is given below. The first and second transmission type laser displacement meters 36A and 36B each are constituted of a light-projecting part 3602 which emits a laser light and a light-receiving part 3604 which receives the laser light emitted. Each laser displacement meter 36A or 36B has been constituted so that the laser light emitted from the light-projecting part 3602 toward the light-receiving part 3604 is partly intercepted by the cylindrical part 1602 of the first flange member 16 or by the cylindrical part 1802 of the second flange member 18. Because of this, when the first flange member 16 supported by the first supporting part 28A or the second flange member 18 supported by the second supporting part 28B is rotated, radial deflection of the outer circumferential surface of the cylindrical part 1602 or 1802 of the flange member 16 or 18 results in fluctuations in the intensity of the laser light received by the light-receiving part 3604. Consequently, the sensor signal S1A or S1B outputted by each light-receiving part 3604 indicates the degree of radial deflection, based on the shaft support part 1610 or 1810, of the outer circumferential surface of the cylindrical part 1602 or 1802 of the first flange member 16 or second flange member 18.

The first and second rotary encoders 3006A and 3006B mounted in the first and second rotating devices 30A and 30B output sensor signals S2A and S2B in the form of a pulse signal at an interval of a given rotation angle during the rotation of the rollers 3004 of these rotating devices 30A and 30B. The information processing part 3802 in the control unit 38 counts these pulse signals, and stores the counts in a memory 3804 in the control unit 38 while relating the counts to the sensor signals S1A and S1B received from the light-receiving parts 3604.

At the time when the degree of deflection indicated by the sensor signal S1A or S1B received from each light-receiving part 3604 is maximum, that rotation angle of the corresponding roller 3004 which is indicated by the sensor signal S2A or S2B received from the rotary encoder 3006A or 3006B is detected. Thus, the direction of radial deflection, based on the shaft support part 1610 or 1810, of the outer circumferential surface of the cylindrical part 1602 or 1802 of the first flange member 16 or second flange member 18 can be calculated from the ratio of the diameter of the roller 3004 to the diameter of the outer circumference of the cylindrical part 1602 or 1802; these diameters are determined beforehand.

Consequently, the first and second transmission type laser displacement meters 36A and 36B disposed on the first and second supporting parts 28A and 28B, the first and second rotary encoders 3006A and 3006B mounted in the first and second rotating devices 30A and 30B, and the information processing part 3802 in the control unit 38 constitute the measuring device for measuring or determining the degree and direction of radical deflection, based on the shaft support part 1610 or 1810, of the outer circumferential surface of each of the cylindrical parts 1602 and 1802 of the first and second flange members 16 and 18 supported by the first and second supporting parts 28A and 28B, as stated above.

The control unit 38 further has a drive control part 3806. This drive control part 3806 reads out from the memory 3804 the information which indicates the degree and direction of deflection of the outer circumferential surface of each of the cylindrical parts 1602 and 1802 of the first and second flange members 16 and 18 and which has been obtained with the measuring device described above. Based on the readout information, the drive control part 3806 controls the motors 3002 of the first and second rotating devices 30A and 30B.

In the case where the degree and direction of radial deflection of the outer circumferential surface of each of the cylindrical parts 1602 and 1802 of the first and second flange members 16 and 18 are measured or determined based on the shaft support part 1610 or 1810, the drive control part 3806 in the control unit 38 controls to simultaneously operate the motors 3002 of the first and second rotating devices 30A and 30B to rotate the first flange member 16 and second flange member 18 supported by the spindles 2806 of the first and second supporting parts 28A and 28B. While the flange members 16 and 18 are being thus rotated, the degree and direction of deflection of the outer circumferential surface of each of the cylindrical parts 1602 and 1802 of the first and second flange members 16 and 18 are simultaneously detected with the measuring device described above.

A procedure for assembling a photoreceptor drum 12 is explained below.

First, the table 26 and the first and second rotating devices 30A and 30B are set in the standby position, and a first flange member 16 and a second flange member 18 are attached respectively to the spindles 2806 of the supporting parts 28A and 28B.

Furthermore, a drum main body 14 is placed on the table 26 located in the standby position.

In this case, the degree and direction of radial deflection of the drum main body 14 based on the fitting holes 1406 formed in both ends thereof are measured or determined beforehand. The information indicating these is inputted to the memory 3804 in the control unit 38.

The drum main body 14 is placed on the table 26, with the direction of the deflection faced in a given direction, e.g., upward. Incidentally, the operation in which the information indicating the degree and direction of deflection of a drum main body 14 is inputted to the memory 3804 in the control unit 38 may be conducted every time when each drum main body 14 is placed on the table 26. Alternatively, use may be made of a method in which the degrees of deflection of many drum main bodies 14 are inputted at a time and these drum main bodies 14 are placed on the table 26 in order of their input.

Incidentally, the attachment of the first and second flange members 16 and 18 and the placement of the drum main body 14 may be conducted by a worker by hand or may be automatically conducted with a machine. Upon the placement of the drum main body 14 on the table 26, the table 26 is moved from the standby position to the measuring/fitting position.

Next, the drive control part 3806 in the control unit 38 controls the elevators 32A and 32B to elevate the first and second rotating devices 30A and 30B to the measuring position so that the rollers 3004 of the rotating devices 30A and 30B come into contact with the outer circumferential surfaces of the cylindrical parts 1602 and 1802 of the first and second flange members 16 and 18.

Subsequently, the control unit 38 simultaneously operates the motors 3002 of the first and second rotating devices 30A and 30B to rotate the first and second flange members 16 and 18 respectively on the bearing holes 1610 and 1810 thereof. While the flange members 16 and 18 are being thus rotated, the degree and direction of radial deflection, based on the shaft support part 1610 or 1810, of the outer circumferential surfaced of each of the cylindrical parts 1602 and 1802 of the first and second flange members 16 and 18 are measured or determined with the measuring device described above.

Simultaneously with the operation described above, the information processing part 3802 in the control unit 38 compares that degree of deflection of the drum main body 14 which has been read from the memory 3804 with the found value of the degree of radial deflection of the outer circumferential surface of each of the cylindrical parts 1602 and 1802 of the first and second flange members 16 and 18 to determine the difference between the degree of deflection of the drum main body 14 and the degree of deflection of the outer circumferential surface of each of the cylindrical parts 1602 and 1802 of the first and second flange members 16 and 18.

In the case where that difference is not larger than the given value shown above, i.e., 15 μm in this embodiment, the drive control part 3806 in the control unit 38 controls the rotation of the motors 3002 of the first and second rotating devices 30A and 30B so that the direction of radial deflection of the outer circumferential surface of each of the cylindrical parts 1602 and 1802 of the first and second flange members 16 and 18 is opposite to the direction of deflection of the drum main body 14, i.e., faces downward in this embodiment.

In the case where that difference exceeds the given value, i.e., exceeds 15 μm in this embodiment, this fact is displayed by a display means such as, e.g., lamp flashing or made noticed with a sound. Namely, it is made noticed that a photoreceptor drum 12 having a degree of deflection not more than a given value, i.e., a photoreceptor drum 12 having a degree of deflection of 15 μm or less in this embodiment, is not obtained from the combination of the drum main body 14 placed on the table 26 with the first and second flange members 16 and 18 supported by the supporting parts 28A and 28B.

In this case, use may be made of a method in which the drum main body 14 placed on the table 26 and the first and second flange members 16 and 18 supported by the supporting parts 28A and 28*b* are wholly removed, and a next fresh drum main body 14 is placed on the table 26 and a next fresh first and second flange member 16 and 18 are attached to the supporting parts 28A and 28B to conduct the above-described operation from the beginning.

Alternatively, use may be made of a method in which one or two of the first and second flange members 16 and 18 and drum main body 14 are removed and replaced by next fresh members so that the difference becomes 15 μm or less, and the operation described above is conducted from the beginning.

As described above, when that difference is not more than the given value, i.e., 15 μm in this embodiment, the drive control part 3806 in the control unit 38 controls the rotation of the motors 3002 of the first and second rotating devices 30A and 30B so that the direction of radial deflection of the outer circumferential surface of each of the cylindrical parts 1602 and 1802 of the first and second flange members 16 and 18 faces downward. Upon this adjustment, the drive control part 3806 controls the elevators 32A and 32B to lower the first and second rotating devices 30A and 30B to the standby position.

Next, the drive control part 3806 in the control unit 38 controls the moving device 34 to move the second supporting part 28B toward the drum main body 14. In this operation, the second flange member 18 is pushed by the moving device 34 and comes into contact with an end part of the drum main body 14, whereby the drum main body 14 is moved toward the first flange member 16. Thus, the other end of the drum main body 14 shortly comes into contact with the first flange member 16. Thereafter, the moving device 34 further pushes the second flange member 18, whereby the cylindrical parts 1602 and 1802 of the first flange member 16 and second flange member 18 are respectively fitted into and fixed to the fitting holes 1406 in both ends of the drum main body 14.

Consequently, according to the method and apparatus for assembling a photoreceptor drum 12 in this embodiment, a photoreceptor drum 12 having a degree of deflection not more than a given value (e.g., 15 μm) can be easily obtained without fail.

Tests 1 and 2 were conducted in which many photoreceptor drums 12 were assembled from many drum main bodies 14, many first flange members 16, and many second flange members 18 by the assembling method according to this embodiment. Furthermore, Test 3 as a Comparative Example was conducted in which many photoreceptor drums 12 were assembled by fitting and fixing a first and second flange member 16 and 18 into a drum main body 14 without conducting phase adjustment.

In Test 1, twenty-five photoreceptor drums 12 were assembled by fitting a first and second flange member 16 and 18 made of a synthetic resin and respectively having 8-mm bearing holes 1610 and 1810 into the fitting holes formed in both ends of a drum main body 14 made of an aluminum alloy having an outer diameter of 20 mm, length of 250 mm, and fitting-hole wall thickness of 0.75 mm.

The photoreceptor drums 12 each were examined for the degree of radial deflection based on the central axis connecting the centers of the bearing holes 1610 and 1810 in both ends of the photoreceptor drum 12.

The results of Test 1 are shown in Table 2.

TABLE 2

| No. | Deflection of drum main body | Deflection of first flange member | Deflection of second flange member | Deflection of completed drum |
|---|---|---|---|---|
| 1 | 16 | 14 | 12 | 7 |
| 2 | 9 | 16 | 13 | 2 |
| 3 | 7 | 16 | 13 | 5 |
| 4 | 11 | 15 | 10 | 5 |
| 5 | 11 | 14 | 8 | 6 |
| 6 | 8 | 14 | 10 | 4 |
| 7 | 5 | 16 | 11 | 8 |
| 8 | 18 | 16 | 11 | 5 |
| 9 | 13 | 17 | 12 | 6 |
| 10 | 7 | 15 | 10 | 6 |
| 11 | 9 | 14 | 10 | 3 |
| 12 | 18 | 16 | 10 | 6 |
| 13 | 7 | 16 | 10 | 7 |
| 14 | 12 | 16 | 10 | 5 |
| 15 | 5 | 15 | 12 | 8 |
| 16 | 11 | 15 | 12 | 9 |
| 17 | 9 | 17 | 8 | 6 |
| 18 | 6 | 17 | 10 | 9 |
| 19 | 19 | 15 | 10 | 8 |
| 20 | 4 | 19 | 10 | 4 |
| 21 | 12 | 14 | 9 | 6 |
| 22 | 9 | 15 | 12 | 7 |
| 23 | 17 | 15 | 11 | 6 |
| 24 | 15 | 18 | 9 | 6 |
| 25 | 15 | 15 | 11 | 5 |
| Average deflection | 10.9 | 15.6 | 10.5 | 6.0 |
| Standard deviation | 4.5 | 1.2 | 1.4 | 1.7 |

In Test 2, twenty photoreceptor drums 12 were assembled by fitting a first and second flange member 16 and 18 made of a synthetic resin and respectively having 8-mm bearing holes 1610 and 1810 into the fitting holes formed in both ends of a drum main body 14 made of an aluminum alloy having an outer diameter of 30 mm, length of 350 mm, and fitting-hole wall thickness of 0.75 mm.

The photoreceptor drums 12 each were examined for the degree of radial deflection based on the central axis connecting the centers of the bearing holes 1610 and 1810 in both ends of the photoreceptor drum 12.

The results of Test 2 are shown in Table 3.

TABLE 3

| No. | Deflection of drum main body | Deflection of first flange member | Deflection of second flange member | Deflection of completed drum |
|---|---|---|---|---|
| 1 | 10 | 11 | 12 | 11 |
| 2 | 10 | 9 | 15 | 7 |
| 3 | 11 | 12 | 13 | 11 |
| 4 | 10 | 10 | 10 | 8 |
| 5 | 6 | 9 | 11 | 4 |
| 6 | 10 | 12 | 11 | 3 |
| 7 | 11 | 10 | 14 | 12 |
| 8 | 7 | 10 | 13 | 8 |
| 9 | 7 | 9 | 13 | 4 |
| 10 | 10 | 11 | 11 | 11 |
| 11 | 13 | 9 | 12 | 14 |
| 12 | 14 | 10 | 11 | 4 |
| 13 | 9 | 10 | 14 | 8 |
| 14 | 9 | 11 | 10 | 10 |
| 15 | 3 | 10 | 11 | 7 |
| 16 | 6 | 12 | 13 | 8 |
| 17 | 11 | 11 | 11 | 4 |
| 18 | 5 | 9 | 11 | 4 |
| 19 | 8 | 10 | 12 | 5 |
| 20 | 6 | 9 | 12 | 3 |
| Average deflection | 8.9 | 10.3 | 11.9 | 7.3 |
| Standard deviation | 2.8 | 1.1 | 1.3 | 3.4 |

In Test 3, photoreceptor drums 12 were assembled without using the assembling method according to this embodiment. Namely, photoreceptor drums 12 were assembled without taking account of the direction of radial deflection of each drum main body 14 and the directions of deflection of the cylindrical parts 1602 and 1802 of the first and second flange members 16 and 18 in any way.

Twenty photoreceptor drums 12 were assembled by fitting a first and second flange member 16 and 18 made of a synthetic resin and respectively having 8-mm bearing holes 1610 and 1810 into the fitting holes formed in both ends of a drum main body 14 made of an aluminum alloy having an outer diameter of 30 mm, length of 350 mm, and fitting-hole wall thickness of 0.75 mm.

The photoreceptor drums 12 each were examined for the degree of radial deflection based on the central axis connecting the centers of the bearing holes 1610 and 1810 in both ends of the photoreceptor drum 12.

The results of Test 3 are shown in Table 4.

TABLE 4

| No. | Deflection of drum main body | Deflection of first flange member | Deflection of second flange member | Deflection of completed drum |
|---|---|---|---|---|
| 1 | 10 | 11 | 11 | 21 |
| 2 | 9 | 9 | 12 | 7 |
| 3 | 14 | 10 | 11 | 16 |
| 4 | 6 | 9 | 11 | 6 |
| 5 | 12 | 9 | 14 | 17 |
| 6 | 7 | 11 | 14 | 11 |
| 7 | 13 | 9 | 10 | 21 |
| 8 | 11 | 10 | 11 | 8 |
| 9 | 9 | 9 | 11 | 19 |
| 10 | 9 | 10 | 12 | 23 |
| 11 | 8 | 9 | 14 | 11 |
| 12 | 6 | 8 | 13 | 13 |
| 13 | 5 | 10 | 10 | 18 |
| 14 | 8 | 9 | 11 | 16 |
| 15 | 5 | 10 | 14 | 7 |
| 16 | 9 | 9 | 11 | 9 |
| 17 | 7 | 10 | 9 | 10 |
| 18 | 10 | 11 | 11 | 18 |
| 19 | 13 | 11 | 14 | 20 |
| 20 | 9 | 12 | 13 | 19 |
| Average deflection | 9.0 | 9.8 | 11.9 | 14.5 |
| Standard deviation | 2.6 | 1.0 | 1.6 | 5.5 |

As apparent from Table 2, all the twenty-five photoreceptor drums 12 obtained in Test 1 had a degree of deflection of 9 μm or less. The highest degree of deflection was 9 μm and the average degree of deflection was 6.0 μm. Photoreceptor drums 12 extremely reduced in deflection were obtained without fail.

As apparent from Table 3, all the twenty photoreceptor drums 12 obtained in Test 2 had a degree of deflection of 14 μm or less. The highest degree of deflection was 14 μm and the average degree of deflection was 7.3 μm. In Test 2 also, photoreceptor drums 12 exceedingly reduced in deflection were obtained without fail.

Furthermore, as apparent from Table 4, the photoreceptor drums 12 having a degree of deflection up to 15 μm were less than half of the photoreceptor drums 12 obtained in Test 3, although the drum main bodies 14 and first and second flange members 16 and 18 used in Test 3 had almost the same degrees of deflection as in Test 2. The method used in Test 3 cannot be employed in a production line.

Consequently, as apparent also from Tables 2 to 4, photoreceptor drums 12 having a degree of deflection not more than a given value, e.g., photoreceptor drums 12 having a degree of deflection of 15 μm or less when the given value is 15 μm, or e.g., photoreceptor drums 12 having a degree of deflection of 10 μm or less when the given value is 10 μm, can be easily obtained without fail according to the invention.

In this embodiment, an explanation was given on a photoreceptor drum 12 comprising a drum main body 14 and a first and second flange member 16 and 18 respectively attached to both ends of the drum main body 14. However, it is a matter of course that the invention is applicable also to a photoreceptor drum 12 comprising a drum main body 14 which has a flange member attached only to one lengthwise-direction end thereof and has, at the other end thereof, a shaft support part integrally formed with the drum main body 14. In this case, the degree and direction of radial deflection of the drum main body 14 are measured or determined based on the shaft support part on said other end of the drum main body 14 and the fitting hole 1406, and the difference between this degree of deflection of the drum main body 14 and the degree of deflection of the outer circumferential surface of the cylindrical part of the flange member is determined.

Furthermore, in the embodiment described above, the degree and direction of radial deflection of a drum main body 14 were measured or determined before it was placed on the table 26. However, use may be made of a method in which a drum main body 14 is placed on the table 26 and then lifted up with a supporting device not shown in the figure, or a supporting part which rotatably supports a drum main body 14 is disposed in place of the table 26. In this method, during the measurement or determination of the degree and direction of deflection of each of a first and second flange member 16 and 18, the degree and direction of deflection of the drum main body 14 are measured or determined in the same manner as for the first and second flange members 16 and 18.

During the measurement or determination of the degree and direction of radial deflection of a drum main body 14, a mark indicating the direction of the deflection may be put on the drum main body 14 in a position therein which is located outside the image formation region and is externally visible after completion of a photoreceptor drum 12. Furthermore, during the measurement or determination of the degree and direction of deflection of each of a first and second flange member 16 and 18, a mark indicating the direction of the deflection may be put on each flange member 16 or 18 in a position therein which is externally visible after completion of a photoreceptor drum 12. At the time of completion of a photoreceptor drum 12, that the direction of deflection of the outer circumferential surface of each of the cylindrical parts 1602 and 1802 is almost opposite to the direction of deflection of the drum main body 14 can be ascertained from the mark on the drum main body 14 and the marks on the first and second flange members 16 and 18.

Such a constitution in which marks can be ascertained is extremely advantageous for the control of the quality of the photoreceptor drum 12.

In this case, it is desirable that the mark for the drum main body 14 and the marks for the first and second flange members 16 and 18 be put in such positions that the marks meet each other upon completion of the photoreceptor drum 12. Consequently, this may be accomplished by putting either the mark for the drum main body 14 or the marks for the first and second flange members 16 and 18 in a position shifted from the direction of deflection by 180°. Alternatively, use may be made of a method in which a mark is put on the drum main body 14 in a position shifted from the direction of deflection by +90° and a mark is put on each of the first and second flange members 16 and 18 in a position shifted from the direction of deflection by −90°.

Other methods for assembling a photoreceptor drum 12 are explained next.

(Another Assembling Method 1)

First, many drum main bodies 12 having a degree of radial deflection of 7 μm or less are prepared.

Furthermore, many flange members 16 and 18 having a coaxiality of 5 μm or less are prepared (that a flange member 16 or 18 has a coaxiality of 5 μm or less means that the distance between the center of the outer circumference of the cylindrical part 1602 or 1802 of the flange member 16 or 18 and the center of the shaft support part 1610 or 1810 is 5 μm or less).

These drum main bodies 12 are randomly combined with the flange members 16 and 18 to obtain photoreceptor drums 12.

By this assembling method, photoreceptor drums 12 having an average degree of deflection of 12 μm or less are theoretically obtained. It is practically possible to stably obtain photoreceptor drums 12 having a degree of deflection of 15 μm or less, even when the influences of the distortion of the cylindrical parts 1602 and 1802 of the flange members 16 and 18 and the inclination of the flange members 16 and 18 in the assembly step are taken into account.

Test 4 was conducted in which the assembling method described above was used to assemble many photoreceptor drums 12 from many drum main bodies 14, many first flange members 16, and many second flange members 18.

In Test 4, twenty photoreceptor drums 12 were assembled by fitting a first and second flange member 16 and 18 made of a synthetic resin and respectively having 8-mm bearing holes 1610 and 1810 into the fitting holes formed in both ends of a drum main body 14 made of an aluminum alloy having an outer diameter of 30 mm, length of 350 mm, and fitting-hole wall thickness of 0.75 mm.

The drum main bodies 12 used had an average degree of radial deflection of 7.7 μm.

The flange members 16 and 18 used had average coaxialities of 4.2 μm and 4.9 μm, respectively.

The photoreceptor drums 12 each were examined for the degree of radial deflection based on the central axis connecting the centers of the bearing holes 1610 and 1810 in both ends of the photoreceptor drum 12.

The results of Test 4 are shown in Table 5.

TABLE 5

| No. | Deflection of drum main body | Deflection of first flange member | Deflection of second flange member | Deflection of completed drum |
|---|---|---|---|---|
| 1 | 10 | 3 | 5 | 9 |
| 2 | 8 | 4 | 3 | 13 |
| 3 | 7 | 6 | 4 | 12 |
| 4 | 5 | 5 | 6 | 14 |
| 5 | 9 | 7 | 7 | 13 |
| 6 | 7 | 7 | 6 | 8 |
| 7 | 8 | 4 | 3 | 6 |
| 8 | 10 | 6 | 4 | 15 |
| 9 | 9 | 4 | 6 | 9 |
| 10 | 6 | 3 | 4 | 11 |
| 11 | 8 | 5 | 5 | 8 |
| 12 | 7 | 8 | 2 | 14 |
| 13 | 5 | 3 | 4 | 7 |
| 14 | 9 | 2 | 2 | 13 |
| 15 | 8 | 3 | 6 | 14 |
| 16 | 6 | 3 | 3 | 11 |
| 17 | 7 | 5 | 4 | 12 |
| 18 | 10 | 2 | 8 | 15 |
| 19 | 8 | 4 | 6 | 13 |
| 20 | 7 | 1 | 9 | 9 |
| Average deflection | 7.7 | 4.2 | 4.9 | 11.3 |
| Standard deviation | 1.5 | 1.8 | 1.9 | 2.8 |

As apparent from Table 5, all the twenty photoreceptor drums 12 obtained in Test 4 had a degree of deflection of 15 μm or less. The average degree of deflection was 11.3 μm.

In Test 4, use of drum main bodies 14 having an average degree of deflection of 7.7 μm resulted in the values shown above. In other words, use of drum main bodies 14 including ones having a degree of deflection exceeding 7 μm resulted in the values shown above. It is therefore apparent that when drum main bodies 14 each having a degree of deflection of 7 μm or less are used, then the average degree of deflection becomes a smaller value and photoreceptor drums 12 each having a degree of deflection of 15 μm or less are obtained almost without fail.

Furthermore, when each combination of a drum main body 14 with flange members 16 and 18 is subjected to phase adjustment to make the direction of deflection of the drum main body 14 almost opposite to that of the flange members 16 and 18 and the flange members 16 and 18 are then fitted into and fixed to the drum main body 14 as in the embodiment described above, then photoreceptor drums 12 of 10 μm or less are obtained almost without fail.

(Another Assembling Method 2)

First, a bearing fitting hole is formed in each of both lengthwise-direction ends of a drum main body 14, and a flange member fitting hole (1406) is formed in one or each lengthwise-direction end of the drum main body 14 continuously outside the bearing fitting hole.

Next, a bearing (e.g., a rolling bearing or sliding bearing) is fitted into and fixed to each bearing fitting hole in the drum main body 14.

Subsequently, a flange member (a first flange member 16 or second flange member 18) is attached to the drum main body 14 on outer side of the bearing by fitting and fixing the cylindrical part (1602 or 1802) of the flange member into the fitting hole 1406.

Disposition of the photoreceptor drum 12 in an image-forming apparatus is accomplished by causing the photoreceptor drum 12 to be rotatably supported with a shaft passing through the bearing holes in the bearings in both ends of the drum main body 14.

According to this assembling method, the radial deflection of the photoreceptor drum 12 is based on the bearing holes in the bearings in both ends of the drum main body 14, and the degree of radial deflection of the photoreceptor drum 12 is the sum of the degree of deflection based on the bearing fitting holes in both ends of the drum main body 14 and the degree of deflection of the bearings. Namely, the radial deflection of the flange members does not influence the deflection of the photoreceptor drum 12. Because of this, photoreceptor drums 12 in which the degree of radial deflection is as extremely small as 15 μm or less, or 10 μm or less, can be easily obtained without fail.

(Another Assembling Method 3)

First, a fitting hole 1406 is formed in each of both lengthwise-direction ends of a cylindrical body 1402. A first and second flange member 16 and 18 are attached by fitting and fixing the cylindrical parts 1602 and 1802 thereof into the respective fitting holes 1406. In this assembling method, it is preferred that flange members made of a metal be used as the first and second flange members 16 and 18.

Next, the outer circumferential surface of the cylindrical body 1402 is turned using as a base the bearing holes 1610 and 1810 of the first and second flange members 16 and 18. In this case, the bearing holes 1610 and 1810 correspond to the shaft support parts rotatably supported on the frame side of an image-forming apparatus. There are cases where the shaft support parts are not bearing holes but shafts.

Subsequently, a photosensitive layer 1404 is formed on the outer circumferential surface of the cylindrical body 1402.

According to this assembling method also, photoreceptor drums 12 in which the degree of radial deflection is as extremely small as 15 μm or less, or 10 μm or less, can be easily obtained without fail because the outer circumferential surface of the cylindrical body 1402 has been turned using as a base the bearing holes 1610 and 1810 of the first and second metallic flange members 16 and 18 already fitted and fixed into the cylindrical body 1402.

The photoreceptor drum 12 (drum main body 14) to be used in the invention is not particularly limited as long as it is one for use as an electrophotographic photoreceptor drum. For example, use is made of a metallic material such as aluminum, an aluminum alloy, stainless steel, copper, or nickel, an insulating base, e.g., a polyester film, paper, or glass, on which a conductive layer of, e.g., aluminum, copper, palladium, tin oxide, or indium oxide has been formed, or the like. When a nonconductive material is used, a technique generally employed is to impart conductivity by incorporating a conductive powder or to impart surface conductivity by the vacuum deposition of a metal. Preferred is a drum made of aluminum or an aluminum alloy. The drum may have any shape as long as a flange can be attached (by fitting, bonding, etc.) to each end thereof. In general, however, a cylindrical drum is used.

An explanation is given below on the case where cylindrical aluminum or a cylindrical aluminum alloy is used as the drum. Aluminum or an aluminum alloy such as A1050, A3003, or A6063 is processed into a cylindrical shape by the port-hole method, mandrel method, etc., and then subjected to processings such as, e.g., drawing and turning in order to obtain a cylinder having given values of wall thickness, length, and outer diameter. For the purpose of coping with density unevenness, the drum surface may be finished by turning so as to result in a specific surface roughness.

The photoreceptor drum 12 to be used in the invention comprises a drum main body 14 and a photosensitive layer formed thereon. Although a photosensitive layer may be directly formed, it is preferred to form a blocking layer before a photosensitive layer is formed thereon, from the standpoint of preventing density unevenness. The term blocking layer herein means an anodized coating film, an undercoat layer, or the like.

An anodized coating film is formed by subjecting the surface of the drum main body 14 to an anodization treatment. It is preferred that prior to the anodization treatment, the surface be subjected to a degreasing treatment by any of various degreasing/cleaning methods using an acid, alkali, organic solvent, surfactant, emulsion, electrolysis, etc. An anodized coating film may be formed by an ordinary method, for example, by conducting an anodization treatment in an acid bath such as chromic acid, sulfuric acid, oxalic acid, boric acid, or a sulfamic acid. However, an anodization treatment in sulfuric acid gives most satisfactory results. In the case of an anodization treatment in sulfuric acid, it is preferred to regulate the conditions so as to include a sulfuric acid concentration of 100-300 g/L, dissolved aluminum concentration of 2-15 g/L, liquid temperature of 0-30° C., electrolysis voltage of 10-20 V, and current density of 0.5-2 A/$dm^2$. However, the conditions should not be construed as being limited to these. The thickness of the anodized coating film thus formed is generally 20 μm or smaller, preferably 10 μm or smaller, more preferably 7 μm or smaller.

The drum main body 14 which has undergone the anodization treatment can be subjected to a sealing treatment and a dyeing treatment. The sealing treatment is a step in which the porous layer is sealed by growing, e.g., aluminum hydroxide in the layer. Although the sealing treatment may be conducted by an ordinary method, it is preferred to immerse the drum main body 14 in a liquid containing nickel ions (e.g., a liquid containing nickel acetate or a liquid containing nickel fluoride) before the sealing. In the case where a dyeing treatment is conducted, the drum main body 14 is immersed in a solution of an organic or inorganic compound salt to cause the drum main body 14 to adsorb the salt. For example, this treatment is conducted under the conditions of a concentration of a water-soluble organic dye, such as an azo compound, of 1-10g/L, liquid temperature of 20-60° C., pH of 3-9, and immersion time of 1-20 minutes.

As the undercoat layer can be used an organic layer made of poly(vinyl alcohol), casein, polyvinylpyrrolidone, poly (acrylic acid), cellulose derivative, gelatin, starch, polyurethane, polyimide, polyamide, or the like. Preferred of these is a polyamide resin, which has excellent adhesion to the drum main body 14 and has low solubility in solvents for use in a coating fluid for forming a charge-generating layer. Incorporation of fine particles of a metal oxide, such as alumina or titania, or an organic or inorganic colorant into the undercoat layer is effective. The thickness of the undercoat layer is generally 0.1-10 μm, preferably 0.2-5 μm. In the invention, an undercoat layer may be formed after the drum main body 14 has undergone an anodization treatment, sealing treatment, dyeing treatment, etc.

A photosensitive layer is formed on the drum main body 14. The photosensitive layer to be used can be any of: one formed by superposing a charge-generating layer containing a charge-generating substance and a charge-transporting layer in this order; one formed by superposing these layers in the reverse order; the so-called single-layer type comprising a charge-transporting medium containing particles of a charge-generating substance dispersed therein; and the like. However, a multilayer type photosensitive layer comprising a charge-generating layer and a charge-transporting layer is preferred. In the case where the photosensitive layer has a single-layer structure, a known one comprising a binder material and a photosensitive material dispersed therein is used. Examples thereof include a ZnO photosensitive layer sensitized with a colorant, a CdS photosensitive layer, and a photosensitive layer comprising a charge-transporting substance and a charge-generating substance dispersed therein.

The charge-generating layer comprises a charge-generating substance and a binder resin. The charge-generating substance is not particularly limited as long as it is a substance for use in electrophotographic photoreceptors. For example, use can be made of selenium and alloys thereof, arsenic-selenium, cadmium sulfide, zinc oxide, and other inorganic photoconductors and organic pigments such as phthalocyanines, azo compounds, quinacridone, polycyclic quinones, perylene, indigo, and benzimidazole. Especially preferred are phthalocyanine pigments such as phthalocyanines having coordinated thereto a metal or an oxide or chloride thereof, such as copper, indium chloride, potassium chloride, tin, oxytitanium, zinc, or vanadium, and metal-free phthalocyanines and azo pigments such as monoazo, bisazo, trisazo, and polyazo compounds. Especially preferred of these are phthalocyanine pigments. In particular, oxytitanium phthalocyanine having a specific crystal system is preferred. This is because oxytitanium phthalocyanine is more apt to undergo thermal crystal conversion than ordinary pigments.

Examples of such oxytitanium phthalocyanine include one which, in X-ray diffractometry with a $CuK_{\alpha}$ line, has a maximum diffraction peak at a Bragg angle (2θ±0.2°) of 27.3°. However, the oxytitanium phthalocyanine should not be construed as being limited to this example. The crystal form of this oxytitanium phthalocyanine is one generally called Y-form or D-form and shown in, e.g., JP-A-62-67094, FIG. 2 (referred to as II-form in this patent document); JP-A-2-8256, FIG. 1; JP-A-64-82045, FIG. 1; and *Denshi Shashin Gakkaishi*, Vol.92 (published in 1990), No.3, pp. 250-258 (referred to as Y-form in this publication). Although the oxytitanium phthalocyanine of this crystal form is characterized by showing a maximum diffraction peak at 27.3°, it generally shows peaks at 7.4°, 9.7°, and 24.2°besides that.

There are cases where diffraction peak intensity varies depending on crystallinity, specimen orientation, and measuring method. However, when examined by the Bragg-Brentano focusing method, which is in general use for the X-ray diffractometry of powdery crystals, the oxytitanium phthalocyanine having that crystal form has a maximum diffraction peak at 27.3°. On the other hand, in an examination with a thin-film optical system (generally called the thin-film method or parallel method), there are cases where a maximum diffraction peak does not appear at 27.3°, depending on the state of the specimen. The reason for this may be that the crystal powder is oriented in a specific direction.

Various solvents may be used as dispersion media without particular limitations as long as they are for use in steps for producing electrophotographic photoreceptors. Examples thereof include ethers such as diethyl ether, dimethoxyethane, tetrahydrofuran, and 1,2-dimethoxyethane, ketones such as acetone, methyl ethyl ketone, and cyclohexanone, esters such as methyl acetate and ethyl acetate, alcohols such as methanol, ethanol, and propanol, and aromatic hydrocarbons such as toluene and xylene; these may be used alone or as a mixture of two or more thereof. A dispersion medium may be used in any amount as long as a charge-generating substance can be sufficiently dispersed and the resultant dispersion contains the charge-generating substance in an effective amount. In general, the amount of the dispersion medium is such that the concentration of the charge-generating substance in the dispersion during the dispersing operation is preferably about 3-20 wt %, more preferably about 4-20 wt %.

The binder resin is not particularly limited as long as it is for use in electrophotographic photoreceptors. Examples thereof include vinyl polymers such as poly(vinyl butyral), poly(vinyl acetal), polyesters, polycarbonates, polystyrene, polyester carbonates, polysulfones, polyimides, poly(methyl methacrylate), and poly(vinyl chloride) and copolymers of these, phenoxies, epoxies, silicone resins, and cured resins obtained by partly crosslinking these resins; these may be used alone or in combination of two or more thereof. For mixing the binder resin with the charge-generating substance, use may be made, for example, of any of: a method in which in the step of dispersing the charge-generating substance, the binder resin is added either in a powder form or as a solution of the polymer and simultaneously dispersed; a method in which a dispersion obtained by the dispersion step is added to and mixed with a solution of the binder resin polymer; a method in which conversely the polymer solution is added to and mixed with the dispersion; and the like.

The dispersion obtained here may be diluted with various solvents so as to have liquid properties suitable for application. As such solvents can be used, for example, the solvents enumerated above as examples of the dispersion medium. The proportion of the charge-generating substance to the binder resin is not particularly limited. However, the charge-generating substance is used generally in the range of 5-500 parts by weight per 100 parts by weight of the resin. The dispersion may contain a charge-transporting substance according to need. Examples of the charge-transporting substance include organic polymeric compounds such as polyvinylcarbazole, polyvinylpyrene, and polyacenaphthylene, electron-attracting substances such as fluorenone derivatives, tetracyanoxydimethane, benzoquinone derivatives, naphthoquinone derivatives, anthraquinone derivatives, and diphenoquinone derivatives, heterocyclic compounds such as carbazole, indole, imidazole, oxazole, pyrazole, oxadiazole, pyrazoline, and thiadiazole, aniline derivatives, hydrazone derivatives, aromatic amine derivatives, stilbene derivatives, and electron-donating substances such as polymers having a group derived from any of these compounds in the main chain or side chains thereof. The proportion of the charge-transporting substance to the binder resin is such that the amount of the charge-transporting substance is in the range of 5-500 parts by weight per 100 parts by weight of the binder resin.

The dispersion thus prepared is used to form a charge-generating layer on the drum main body 14 which has undergone turning or on the drum main body 14 having an undercoat layer or anodized coating film formed thereon and a charge-transporting layer is further formed thereon to form a photosensitive layer. Alternatively, a charge-transporting layer is formed on the drum main body 14 and the dispersion is used to form a charge-generating layer thereon to form a photosensitive layer. Furthermore, a photosensitive layer may be formed by using the dispersion to form a charge-generating layer on the drum main body 14. A photosensitive layer having any of these structures can be formed. In the case where a charge-generating layer and a charge-transporting are superposed to form a photosensitive layer, the thickness of the charge-generating layer is preferably in the range of 0.1-10 μm and the thickness of the charge-transporting layer is preferably 10-40 μm. In the case where a photosensitive layer of a single-layer structure is formed, the thickness of the photosensitive layer is preferably in the range of 5-40 μm.

A charge-transporting layer can be produced by applying on the charge-generating layer a coating fluid obtained by dissolving a charge-transporting substance in an appropriate solvent together with a known polymer having excellent binder resin performances and optionally adding an electron-attracting compound or additives including a plasticizer and a pigment thereto.

As the charge-transporting substance in the charge-transporting layer, the charge-transporting substances shown above can be used. As the binder resin to be used together with the charge-transporting substance, various known resins can be used. Use can be made of thermoplastic resins such as polycarbonate resins, polyester resins, polyarylate resins, acrylic resins, methacrylate resins, styrene resins, and silicone resins and curable resins. Preferred are polycarbonate resins, polyarylate resins, and polyester resins, which are especially less apt to suffer wearing or marring. The polycarbonate resins can be ones in which the bisphenol ingredient is any of bisphenol A, bisphenol C, bisphenol P, bisphenol Z, and various known ingredients. The polycarbonate resins may be copolymers of these ingredients. The proportion of the charge-transporting substance to the binder resin is in the range of, for example, 10-200 parts by weight, preferably 30-150 parts by weight, per 100 parts by weight of the binder resin. In the case of a multilayer type photoreceptor, a charge-transporting layer comprising those ingredients as main components is formed.

Examples of the solvent to be used in the coating fluid for forming a charge-transporting layer include ethers such as tetrahydrofuran, 1,4-dioxane, 1,2-dimethoxyethane, and anisole; ketones such as methyl ethyl ketone, 2,4-pentanedione, and cyclohexanone; aromatic hydrocarbons such as toluene and xylene; esters such as ethyl acetate, methyl formate, and dimethyl malonate; ether esters such as 3-methoxybutyl acetate and propylene glycol methyl ether acetate; and chlorinated hydrocarbons such as dichloromethane and dichloroethane. It is, of course, possible to use one or more solvents selected from these. It is preferred to select one or more solvents from tetrahydrofuran, 1,4-dioxane, 2,4-pentanedione, anisole, toluene, dimethyl malonate, 3-methoxybutyl acetate, and propylene glycol methyl ether acetate.

The photosensitive layer may further contain a known plasticizer, antioxidant, ultraviolet absorber, and leveling agent so as to be improved in film-forming properties, flexibility, applicability, and mechanical strength. Furthermore, an overcoat layer may be formed on the photosensitive layer in order to improve mechanical properties and improve resistance to gases such as ozone and $NO_x$. It is a matter of course that the drum main body 14 may further have an adhesive layer, interlayer, transparent insulating layer, and other layers according to need.

In the invention, coating operations for forming the layers described above are conducted by known coating techniques. For example, dip coating, spray coating, spinner coating, blade coating, or the like can be employed to conduct the coating operations.

Examples of the image-forming apparatus of the invention include monochromatic printers, copiers, color printers, color copiers, and facsimile telegraphs. Since the photoreceptor of the invention can provide images of high quality, it is especially suitable for use also in high-resolution image-forming apparatus. In particular, it can be used also in image-forming apparatus which give images having a resolution of 600 dpi or higher. In the image-forming apparatus of the invention, a light source, e.g., a laser light, having a known wavelength region can generally be used to thereby obtain the effect of the invention. However, it is thought that the effect of the invention is produced even in the image-forming apparatus utilizing a light source having a wavelength region in the range of from 380 nm to 600 nm.

The image-forming apparatus comprises a development unit (charging device, developing device, fixing device, charge eraser, and cleaner), the electrophotographic photoreceptor, an optical unit (exposure device), a hopper, a stacker, a conveying passage for conveying a recording medium (paper), a fixing unit, etc.

The hopper supplies a recording medium (paper) to the conveying passage. The stacker stacks up and stores recorded media (printed papers). The conveying passage is a passage through which a recording medium (paper) is conveyed. The fixing unit fixes the image transferred from the electrophotographic photoreceptor to a recording medium (paper).

The development unit gives a developer to an electrostatic latent image formed on the electrophotographic photoreceptor to thereby conduct development. The electrophotographic photoreceptor is a device on which an electrostatic latent image corresponding to the image to be obtained is formed and from which the image developed by the development unit is transferred to a recording medium (paper). The optical unit scans the electrophotographic photoreceptor with a laser light modulated according to image data (information) to thereby form an electrostatic latent image.

The operation of the image-forming apparatus is explained below. A charging device, e.g., a corotron or scorotron, is used to almost evenly charge the surface of the electrophotographic photoreceptor. A host computer sends a printing command based on information on an image, characters, etc. Upon receipt of the printing command sent from the host computer, the image-forming apparatus demands data when it has prepared for printing. Upon receipt of the data, the optical unit of the image-forming apparatus scans the electrophotographic photoreceptor with a laser light modulated according to the data. As a result, those areas on the electrophotographic photoreceptor which have been irradiated with the laser light are deprived of charges to thereby form an electrostatic latent image on the electrophotographic photoreceptor. Thereafter, the development unit gives a developer, e.g., a toner, to the electrostatic latent image formed on the electrophotographic photoreceptor to form a visible image on the electrophotographic photoreceptor. Subsequently, a recording medium (paper) is superposed on this visible image and charges opposite to those of the developer are given to the recording medium (paper) from the back of the recording medium (paper) to thereby transfer the visible image to the recording medium (paper) by electrostatic force. The visible image transferred is fused to the recording medium (paper) by heat or pressure and thus becomes a permanent image.

On the other hand, the latent-image charges remaining on the electrophotographic photoreceptor after the transfer are removed by light. The developer, e.g., toner, remaining untransferred is removed by the cleaner. By repeating the process described above, image formation is continuously conducted. In the case where full-color printing is conducted, the image-forming process described above is conducted while separately using photoreceptor drums for respective colors to thereby obtain a color image. Such an image-forming apparatus in which two or more photoreceptor drums are used to give an image is called tandem type.

During the period when sheets of a recording medium (paper) are sent one by one to the conveying passage with the hopper and conveyed with a belt conveyor, visible images formed on the electrophotographic photoreceptor are successively transferred to the recording medium (paper) sheets. The images transferred to the paper sheets are fixed by the fixing unit. Finally, the recording medium (paper) sheets thus printed are stacked up by the stacker and stored.

In the case where full-color printing is conducted, the image-forming apparatus may be one in which the developers, e.g., toners, deposited on the electrophotographic photoreceptors are temporarily transferred to one intermediate transfer belt to dispose the toners of respective colors together on the intermediate transfer belt and thereby form a visible color image, which is then transferred to a recording medium (paper) with a transfer device.

While the invention has been described in detail and with reference to specific embodiments thereof, it will be apparent to one skilled in the art that various changes and modifications can be made therein without departing from the spirit and scope thereof.

INDUSTRIAL APPLICABILITY

As apparent from the explanations given above, the photoreceptor drums of the invention are exceedingly advantageous for obtaining clear images free from positional image shifting and image blurring.

According to the assembling methods and apparatus of the invention, a photoreceptor drum capable of giving clear images can be easily obtained without fail.

Furthermore, according to the image-forming apparatus of the invention, clear images free from positional image shifting and image blurring can be obtained.

The invention claimed is:

1. A photoreceptor drum, comprising:

a drum main body having a first radial deflection;

a photosensitive layer formed on an outer circumferential surface of the drum main body; and a flange member having a second radial deflection attached to one lengthwise-direction end of the drum main body, the flange member configured to rotate on a central axis connecting the center of a shaft support part formed at the other end of the drum main body to the center of a shaft support part formed in or on the flange member, wherein the flange member has a position relative to the drum main body, at which position a direction of the first radial deflection is opposite to a direction of the second radial deflection, and radial deflection of the photoreceptor drum based on the central axis is 15 μm or less.

2. A photoreceptor drum, comprising:

a drum main body having a first radial deflection based on a central axis;

a photosensitive layer formed on an outer circumferential surface of the drum main body;

a first flange member having a second radial deflection attached to a first lengthwise-direction end of the drum main body, the first flange member configured to rotate on a central axis connecting the centers of shaft support parts respectively formed in or on the first flange member and a second flange member; and the second flange member having a third radial deflection attached to a second lengthwise-direction end of the drum main body, the second flange member configured to rotate on the central axis, wherein the first flange member has a first position relative to the drum main body, at which first position a direction of the second radial deflection is opposite to a direction of the first radial deflection, the second flange member has a second position relative to the drum main body, at which second position a direction of the third radial deflection is opposite to the direction of the first radial deflection, and radial deflection of the photoreceptor drum based on the central axis is 15 μm or less.

3. The photoreceptor drum of claim 1 or 2, wherein the shaft support parts are bearing holes.

4. The photoreceptor drum of claim 1 or 2, having been formed so that the degree of radial deflection of the photoreceptor drum based on the central axis is 10 μm or less.

5. An image-forming apparatus employing the photoreceptor drum of claim 1 or 2.

6. A tandem color-image-forming apparatus, comprising:

photoreceptor drums disposed with their lengthwise directions in parallel, wherein at least one of the photoreceptor drums includes a drum main body having a first radial deflection based on a central axis;

a photosensitive layer formed on an outer circumferential surface of the drum main body; and a flange member having a second radial deflection attached to one lengthwise-direction end of the drum main body, the flange member configured to rotate on a central axis connecting the center of a shaft support part formed at the other end of the drum main body to the center of a shaft support part formed in or on the flange member, wherein the flange member has a position relative to the drum main body, at which position a direction of the first radial deflection is opposite to a direction of the second radial deflection, and radial deflection of the photoreceptor drum based on the central axis is 15 μm or less.

7. A tandem color-image-forming apparatus, comprising:

photoreceptor drums disposed with their lengthwise directions in parallel, wherein at least one of the photoreceptor drums includes a drum main body having a first radial deflection based on a central axis;

a photosensitive layer formed on an outer circumferential surface of the drum main body;

a first flange member having a second radial deflection attached to a first lengthwise-direction end of the drum main body, the first flange member configured to rotate on a central axis connecting the centers of shaft support parts respectively formed in or on the first flange member and a second flange member; and the second flange member having a third radial deflection attached to a second lengthwise-direction end of the drum main body, the second flange member configured to rotate on the central axis, wherein the first flange member has a first position relative to the drum main body, at which first position a direction of the second radial deflection is opposite to a direction of the first radial deflection, the second flange member has a second position relative to the drum main body, at which second position a direction of the third radial deflection is opposite to the direction of the first radial deflection, and radial deflection of the photoreceptor drum based on the central axis is 15 μm or less.

* * * * *